US006992713B2

(12) United States Patent
McCaffrey et al.

(10) Patent No.: US 6,992,713 B2
(45) Date of Patent: Jan. 31, 2006

(54) FULLY INTEGRATED SOLID STATE IMAGER AND CAMERA DISPLAY

(75) Inventors: Nathaniel Joseph McCaffrey, Delaware, NJ (US); Peter Ferdinand Zalud, New Hope, PA (US); Scott Thomas Smith, Los Angeles, CA (US); John Thomas Kalinowski, Flemington, NJ (US)

(73) Assignee: Dialog Semiconductor GmbH, Tech-Nabern (DE)

( * ) Notice: Subject to any disclaimer, the term of this patent is extended or adjusted under 35 U.S.C. 154(b) by 445 days.

(21) Appl. No.: 10/226,383

(22) Filed: Aug. 23, 2002

(65) Prior Publication Data

US 2003/0038887 A1 Feb. 27, 2003

Related U.S. Application Data

(60) Provisional application No. 60/314,820, filed on Aug. 24, 2001.

(51) Int. Cl.
*H04N 5/202* (2006.01)

(52) U.S. Cl. ...................................................... 348/254

(58) Field of Classification Search ................ 348/254, 348/297, 308, 296, 222.1, 255, 256, 372; 358/461

See application file for complete search history.

(56) References Cited

U.S. PATENT DOCUMENTS

| | | | | | |
|---|---|---|---|---|---|
| 4,484,223 | A | * | 11/1984 | Tsunekawa | 348/297 |
| 5,642,163 | A | * | 6/1997 | Watari et al. | 348/297 |
| 5,848,019 | A | * | 12/1998 | Matthews et al. | 365/230.06 |
| 5,909,145 | A | * | 6/1999 | Zimmerman | 330/128 |
| 5,920,345 | A | | 7/1999 | Sauer | |
| 5,929,908 | A | * | 7/1999 | Takahashi et al. | 348/264 |
| 5,949,918 | A | * | 9/1999 | McCaffrey | 358/520 |
| 5,969,758 | A | | 10/1999 | Sauer et al. | |
| 6,002,123 | A | * | 12/1999 | Suzuki | 250/208.1 |
| 6,040,570 | A | * | 3/2000 | Levine et al. | 348/308 |
| 6,101,294 | A | * | 8/2000 | McCaffrey et al. | 382/312 |
| 6,236,394 | B1 | | 5/2001 | Ikeda | |
| 6,259,478 | B1 | | 7/2001 | Hori | |
| 6,555,805 | B2 | * | 4/2003 | Afghahi | 348/308 |

* cited by examiner

*Primary Examiner*—Thai Tran
*Assistant Examiner*—Jason Whipkey
(74) *Attorney, Agent, or Firm*—RatnerPrestia

(57) ABSTRACT

There is shown an single chip CMOS device for capturing a video image. The device includes an APS imager containing an array of pixels for providing a signal representing a scene, a row of extended dynamic range sample and hold circuits for receiving a signal from the array of pixels and a row of linear sample and hold circuits for receiving another signal for said array of pixels. Also included is an image processor for determining a controllable function and for processing a plurality of signals received from the extended dynamic range sample and hold circuits and the linear sample and hold circuits according to said controllable function to form a processed video signal. Further included is a memory for storing the controllable function and the processed video signal.

17 Claims, 5 Drawing Sheets

FULLY INTEGRATED SOLID STATE IMAGER AND CAMERA DISPLAY

CROSS-REFERENCE TO RELATED APPLICATION

This application claims the benefit of U.S. Provisional Application No. 60/314,820, filed Aug. 24, 2001, the contents of which are incorporated herein by reference.

FIELD OF THE INVENTION

The field of the invention relates to imaging systems and, in particular, to a CMOS imaging system including an imager and control circuitry that is fabricated on a single chip that requires low power and provides a high quality image.

BACKGROUND OF THE INVENTION

Traditionally, surveillance systems use off the shelf imagers for acquiring a video image. Typically these imagers generally are not small and require an external power supply. Also, these systems generally do not provide clear images if the captured video has a dark foreground with a bright background or visa versa. When such a video image is viewed on a monitor, little information can be extracted from it.

Furthermore, there are various types of imagers in use today, including charge-coupled device (CCD) imagers and complimentary metal oxide semi-conductor (CMOS) imagers. These imaging systems comprise an array of pixels, each of which contains a light sensitive sensor element such as a photodiode.

CMOS imagers typically utilize an array of active pixel sensors and a row of correlated double-sampling circuits or amplifiers to sample and hold the output of a given row of pixel imagers of the array. The term active pixel sensor (APS) refers to an electronic image sensor in which active devices, such as transistors, are associated with each pixel. APS devices are typically fabricated using CMOS technology.

In a CMOS imaging system, each photodiode accumulates a charge, and therefore a voltage, during the optical integration period, in accordance with the light intensity reaching the photodiode. As charge accumulates, the photodetector begins to fill. In a CMOS system, a voltage temporally stored on the capacitance of a back-biased photodiode falls in accordance with a negative charge generated by photoelectrons. The cumulative amount of charge on the photodiode at the end of the integration period is the pixel value for that pixel position. If, however, a photodetector becomes full before the end of the integration period and any additional photons strike the photodetector, then no additional charge can be accumulated. Thus, for example, a very bright light applied to a photodetector can cause a photodetector to be full before the end of the integration period and thus saturate and lose information.

In CCD imaging systems, the amount of charge that may be integrated in a pixel cell is limited by the depth of the depletion well under the photogate. The depletion gate is formed by applying a potential to the photogate that repels majority carriers from the semiconductor substrate beneath the photogate. Again, as the photogate is exposed to photons and photoelectrons are generated, the depth of the well beneath the photogate decreases. As with CMOS photodiodes, if a CCD photogate is subject to bright illumination it may saturate resulting in the loss of information about relatively bright objects in the image.

U.S. Pat. No. 6,040,570 issued Mar. 21, 2000 to Levine, et al. discloses a method of operating an APS imager to avoid the saturation problem described above. According to this method, the bias potential for the imager is applied in two steps. A first potential is applied before the start of the integration period when the pixels are reset and charge is accumulated for a first subinterval of the integration period. During this first subinterval, bright areas of the image may saturate the photodetectors in parts of the imager. In a second subinterval of the integration period, the bias voltage applied to the photodiode or to the photogate is changed to increase the charge capacity of the pixels. Pixels that previously had been saturated accumulate more charge during this second subinterval, providing a charge differential relative to other pixels that had saturated during the first subinterval. The accumulated charge on each pixel at the end of the integration period is provided as the image signal for that pixel. Thus, the dynamic range of each pixel, and therefore the complete imager, is extended to provide more information per integration period.

Furthermore, U.S. Pat. No. 5,949,918 issued Sep. 7, 1999 to McCaffery discloses a method of performing image enhancement using an APS imager, a video processor and a dual-ported memory. The video processor performs a histogramming operation to creates a look-up-table based on a cumulative distribution function (CDF) for the image. This look-up table requantizes the pixel values to increase differences between closely spaced pixel values in bright and/or dark objects in the image. As the image data is received by the video processor, it is processed through the look-up-table to increase the amount of data visible on the video display no matter what the intensity of the background or foreground of the image.

It would be preferable to use both of these processes in a single chip CMOS imager to provide a low cost, low power imager.

SUMMARY OF THE INVENTION

The present invention is a CMOS imaging device implemented on a single integrated circuit. The device includes an APS imager that contains an array of extended dynamic range (XDR) pixels that provide a signal representing a scene. The device further includes an image processor that calculates a controllable function of the image, and uses this function both to adjust the extended dynamic range of the imager and to requantize the signals received from the imager according to the controllable function.

According to one aspect of the invention, the image processor includes a histogramming function that controls the bias potentials applied to the imager to implement the extended dynamic range feature.

According to another aspect of the invention, the imaging device includes a memory for storing the controllable function and the processed video signal. The memory stores a full frame of the image signal and provides the image frame as two sequential fields.

According to yet another aspect of the invention, the imaging device includes circuitry that converts the video images provided by the imager into a standard format.

According to another aspect of the invention, the imaging device includes a power monitoring circuit that triggers the imaging system synchronous with the line current.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures.

DETAILED DESCRIPTION OF THE DRAWINGS

Figure 1:
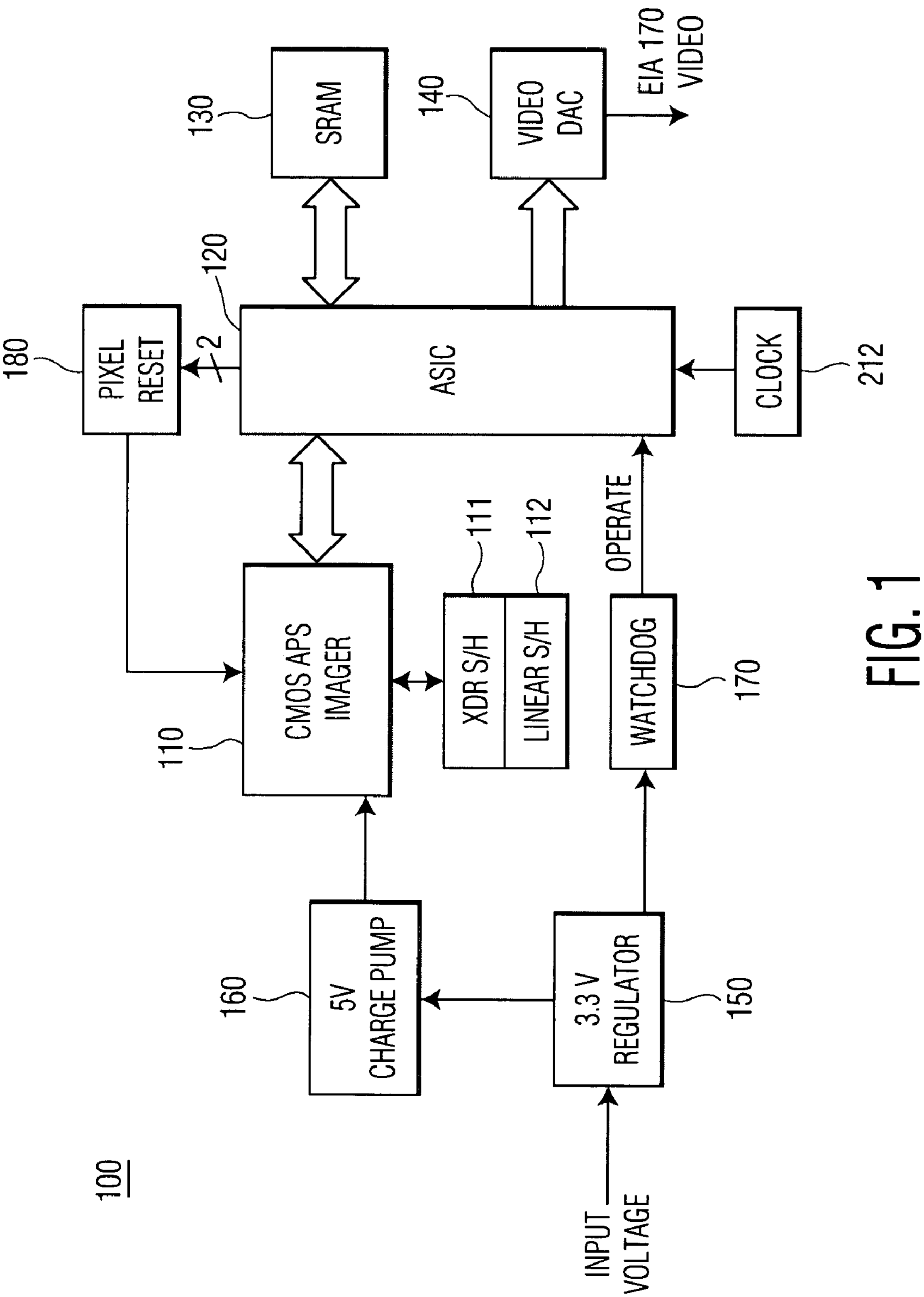
FIG. 1 is a high-level block diagram of an exemplary embodiment of the present invention.

Referring now to FIG. 1, there is shown a high-level block diagram of an exemplary embodiment of the imaging device of the present invention. All of the various components can be fabricated on a single silicon wafer using an industry standard CMOS process. Imaging system 100 includes an active pixel sensor (APS) imager 110. APS imager 110 contains an array of photodetectors and may be, for example, a 640(H)×480(V) array of photodiodes. In the exemplary embodiment of the invention, each photodiode is sampled in a progressive scan mode, creating successive 640×480 pixel image frames at a rate of 30 frames per second. Imaging system 100 converts the progressive scan video frames into interlace scan video fields at a rate of 60 fields per second. This method of generating interlace scan fields from progressive scan frames helps to reduce motion artifacts, such as vertical dot crawl and 30 hz artifacts. APS imager 110 may be an imager such as is described in U.S. Pat. No. 6,040,570 to Levine, et al. which includes a row of extended dynamic range sample and hold circuits 111, and a row of linear sample and hold circuits 112. The output of each photodetector, or pixel element, is transmitted to ASIC 120 for further processing, prior to being converted into a viewable analog signal.

Input voltage is applied at a 3.3 volt regulator 150 which is then fed through a charge pump 160 that provides the operating voltage for the ASIC 120 and other circuitry. In the exemplary embodiment of the invention, the charge pump 160 increases the 3.3 volts provided by the regulator 150 to provide a 5 volt signal to the APS imager 110. This increased supply voltage for the APS imager 110 allows it to produce video signals having wider dynamic range because more voltage levels are available for the extended dynamic range circuitry. 3.3 volt regulator 150 also supplies a signal to watch dog circuit 170 which provides a start up signal to ASIC 120. Watchdog circuit 170, which supplies a clean start-up pulse and allows for almost immediate response by ASIC 120, triggers ASIC 120 as necessary. This allows a scene to be captured in a very short amount of time after initial trigger. In the exemplary embodiment of the invention, the watchdog circuit 170 is responsive to the alternating current (AC) line voltage to provide triggering pulses at a rate of 60 Hz. As described below, these pulses are converted into 30 Hz pulses by the ASIC 120 to extract progressive scan image data from the APS imager 110. The 60 Hz pulses are used to indicate when each of the field images should be provided from the stored frame image.

Pixel reset circuitry 180 is used to apply bias potentials to each pixel element of APS imager 110, as required, to operate the sensor in extended dynamic range mode. The pixel reset circuitry 180 is controlled by ASIC 120, responsive to signals generated by a histogramming function.

Dual-ported static random access memory (SRAM) 130 and a video digital to analog converter (DAC) 140 are coupled to ASIC 120. The SRAM 130 is dual-ported so that it may store frame data transmitted from ASIC 120, as well as a look-up-table (LUT) required for pixel processing and, at the same time, provide stored image data to the video DAC 140.

The ASIC 120 selects only the even lines of the stored progressive scan image, adds horizontal and vertical synchronization signals and provides the composite signal to the DAC 140 to produce an even image field. In the same way, the ASIC 120 processes the odd lines of the stored frame and provides these to the DAC 140 to produce an odd image field. As the odd image field is being provided to the DAC, the ASIC 120 stores the next progressive scan frame into the SRAM 130. In the exemplary embodiment of the invention, the DAC 140 provides a monochrome analog video signal that conforms to an industry standard format (e.g. RS-170) for display and/or recording on industry standard equipment.

Figure 2:
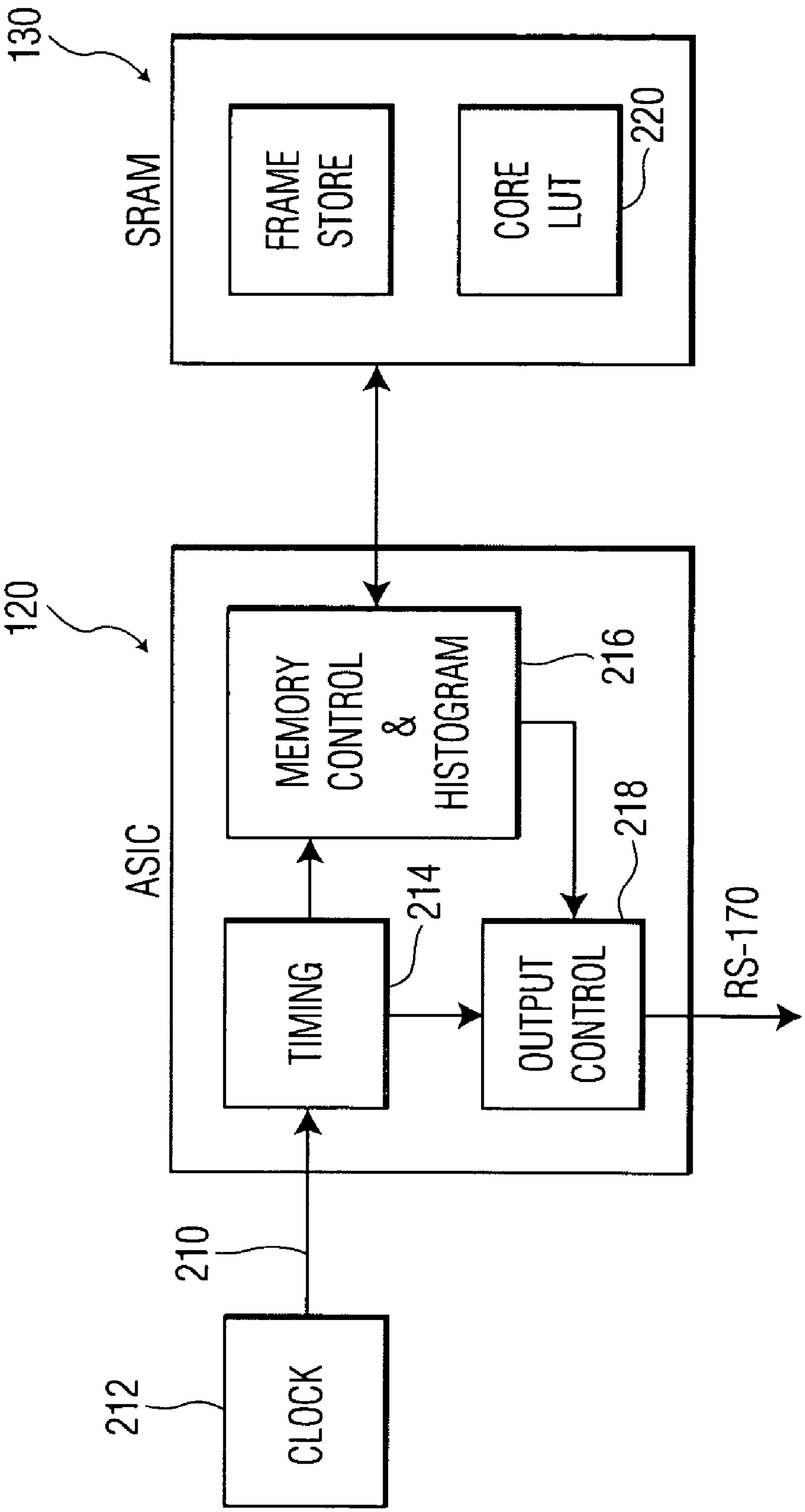
FIG. 2 is a block diagram illustrating functional blocks contained in an exemplary embodiment of the present invention.

The ASIC 120 includes the circuitry that controls the APS imager 110, memory 130 and DAC 140, as well as the circuitry that processes the pixel data collected by the APS imager 110. As shown in FIG. 2, ASIC 120 receives a clock signal 210 from clock circuitry 212. The timing function 214 within ASIC 120 uses the clock signal 210 to control pixel reset circuitry 180 as well as to control the read and write operations for memory 130. ASIC 120 also uses the timing function to generate the horizontal and vertical synchronization signals and all video processing performed by memory control and histogram block 216.

Output control block 218 adds the horizontal and vertical synchronization signals to the interlaced video signal read out from memory 130 and transmits the composite signal to the video DAC 140. This results in a composite video output that is complaint with RS-170 standards.

Memory control and histogram block 216 may, for example, perform video processing as described in U.S. Pat. No. 5,949,918, issued Sep. 7, 1999 to McCaffrey. A pseudo random sampling of the video data is performed to generate a histogram of the luminance levels. The histogram is transformed into a cumulative distribution function (CDF) and is stored in memory 130. A look-up-table (LUT) 220 is created based on the CDF and stored in memory 130 as well. Each unit of pixel data is processed by ASIC 120 through LUT 220 to increase the viewable data in each frame.

As described in the referenced patent, the LUT 220 translates the pixel values returned from the imager into output pixel values that are stored in the memory 130. The LUT 220 requantizes the pixel values to differentiate between closely spaced values. If, for example, the CDF generated by the histogram function of a first image indicates that the image includes i) only relatively dark image data, ii) only relatively bright image data or iii) a mixture of dark image data and bright image data with negligible data having pixel values between the dark image data and the bright image data, then the ASIC 120 will generate a LUT that translates some of the dark and/or bright pixel values into brighter and/or darker values, respectively, to provide more contrast in the areas of the image that do not exhibit significant variation. This translation is based on the relative values of the pixels. Thus, brighter pixels in the image remain bright and darker pixels remain dark.

In the exemplary embodiment of the invention, memory control and histogram circuitry 216 generates a CDF and a LUT for each received image. The LUT, however, is not used on the image from which it was generated, but rather on the next subsequent image. It is contemplated, however, that other schemes may be used. For example, the histogram function may generate an LUT only for every $N^{th}$ image, where N is an integer, for example 10. Alternatively, the histogram function may use one frame period for analysis and another frame period to generate the LUT. In this alternative embodiment, the LUT would not be used for the next image in the sequence, but for the second image occurring after the image used to generate the LUT.

In an exemplary embodiment of the invention, the memory control and histogram circuitry 216 interacts with the pixel reset circuitry 180 to ensure that the processed image data exhibits good dynamic range with minimal quantization distortion. This interaction is described below with reference to FIGS. 4A through 4D and 5.

Figure 3:
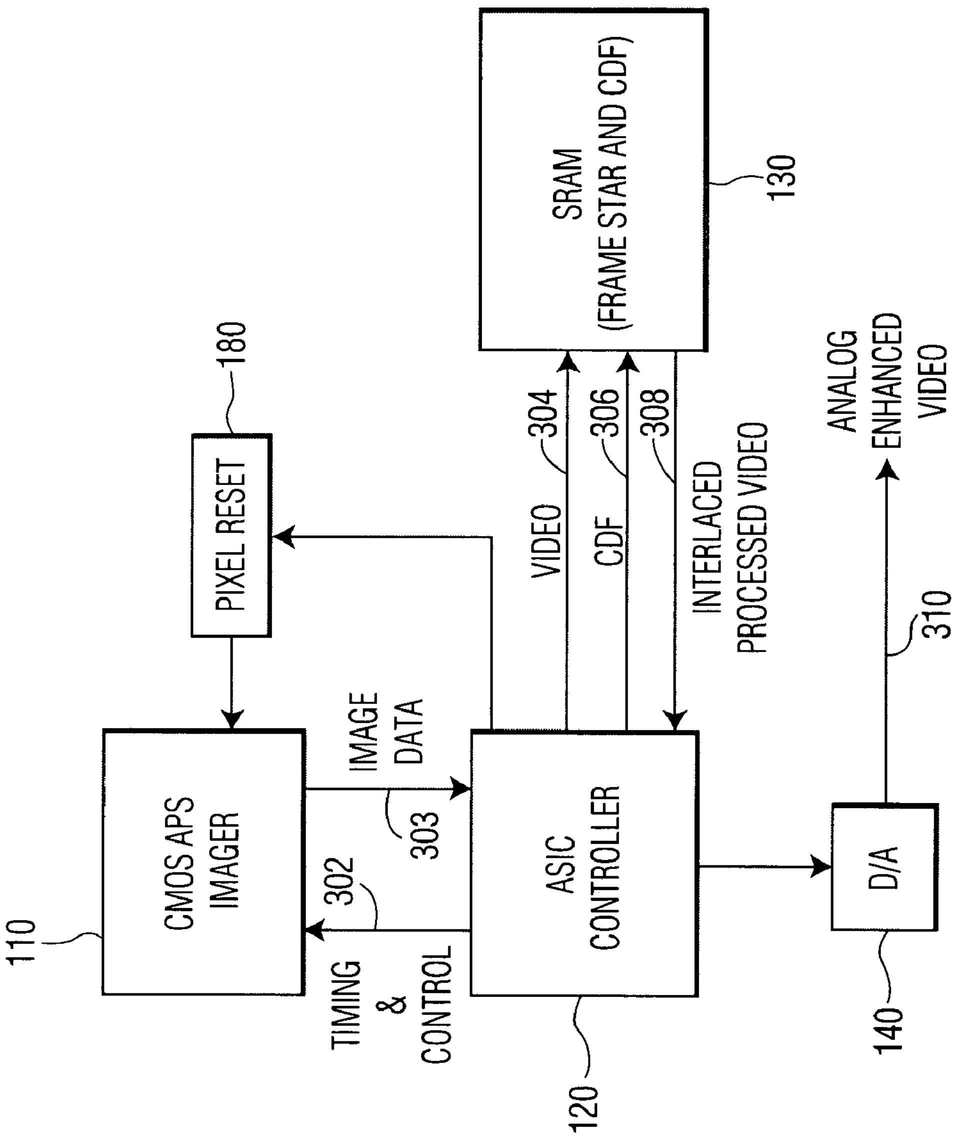
FIG. 3 is a block diagram illustrating signal flow in an exemplary embodiment of the present invention.

FIG. 3, shows a block diagram of an exemplary embodiment of the present invention. FIG. 3 illustrates the flow of data and control signals within the device 100. As explained above, ASIC 120 transmits timing and control signals 302 to APS imager 110. APS imager 110 generates and transmits image data 303 in the form of a sequence of individual image frames to ASIC 120 for processing. The sequence of frames (video) 304 is transmitted and stored in memory 130 along with a CDF 306. ASIC 120 then processes the progressive scan video and the image is read out in interlaced mode. ASIC 120 adds control and other necessary signals to the interlaced video 308, transmits the video 308 to video DAC 140, which in turn outputs the signal as an analog composite video signal 310. All the functional blocks illustrated in FIG. 3 are fabricated on a single chip using a CMOS process.

Figure 4A:
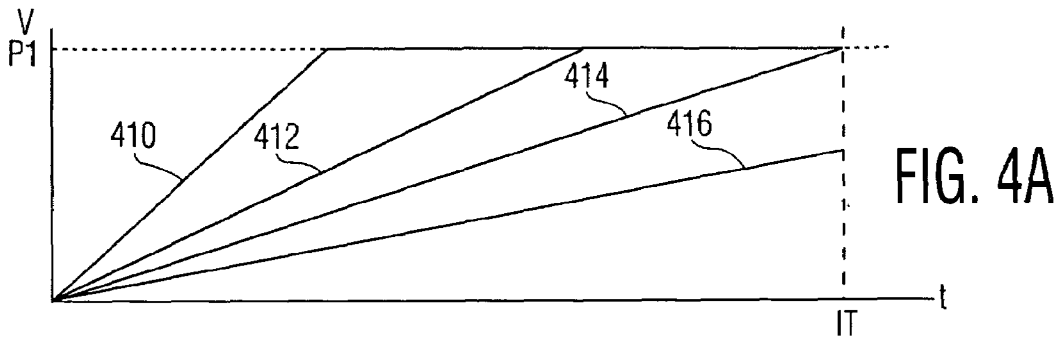
FIGS. 4A, 4B, 4C and 4D are graphs of voltage versus time that are useful for describing the operation of the invention.

FIGS. 4A through 4D are graphs of time versus voltage that are useful for describing the interaction between the histogramming function 216 and the reset circuitry 180. The curves 410, 412, 414 and 416 represent different illumination intensities with 410 being the most intense and 416 being the least intense. The time value It represents the time interval over which light impinging on the pixel is integrated. As shown in FIG. 4A, illumination levels 410, 412 and 414 will appear equal at time IT because each of these illumination levels saturates the imager. As described in the above-referenced patent to Levine, one method that may be used to increase the contrast of the imager is to reset the imager to a first level during a first part of the integration period and then increase the reset level during a later part of the period.

Figure 4B:
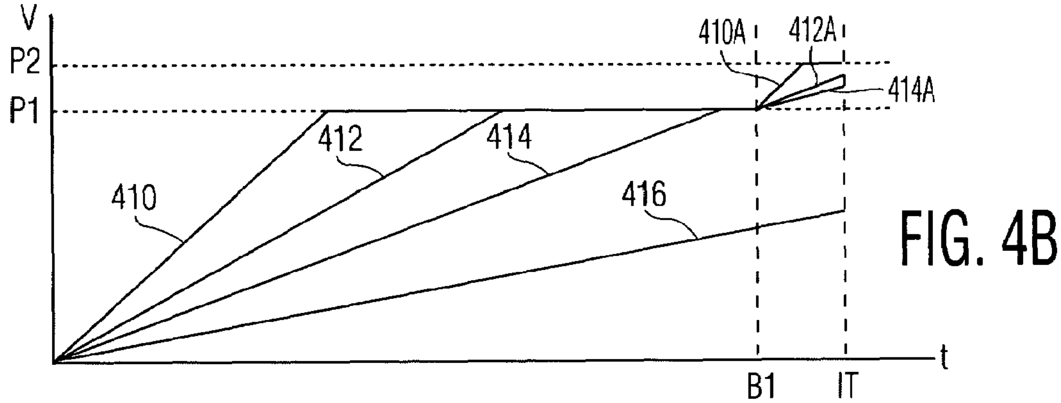

As shown in FIG. 4B, the imager is reset so that it has a charge integration potential of P1 at the beginning of the integration period. At time T1, the integration potential is increased to P2, allowing additional charge to accumulate on the imager. As shown in FIG. 4B, now only illumination level 410 saturates the image (i.e. 410A). Illumination levels 412 and 414 are distinguishable as separate levels because of the increased reset potential. Even though these potentials are distinguishable, illumination levels greater than 410 can not be distinguished and the amount of difference between the final levels is not indicative of the relative levels of illumination.

Figure 4C:
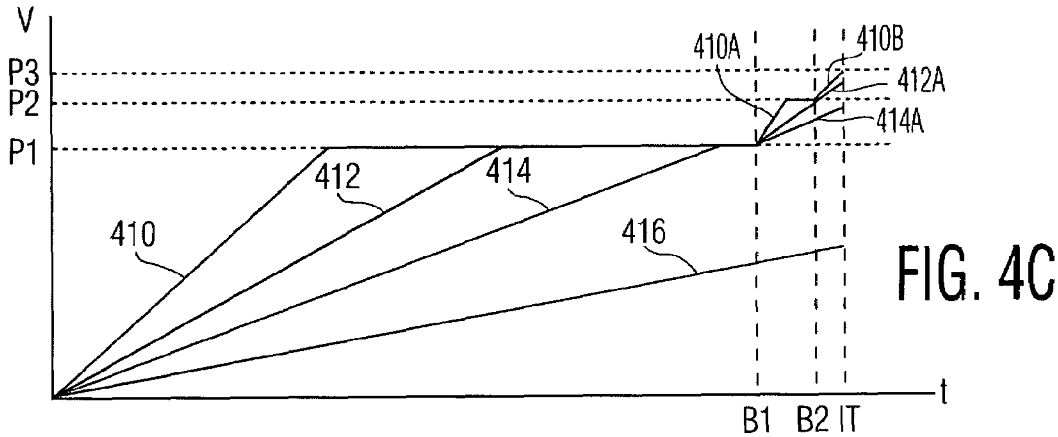
Figure 4D:
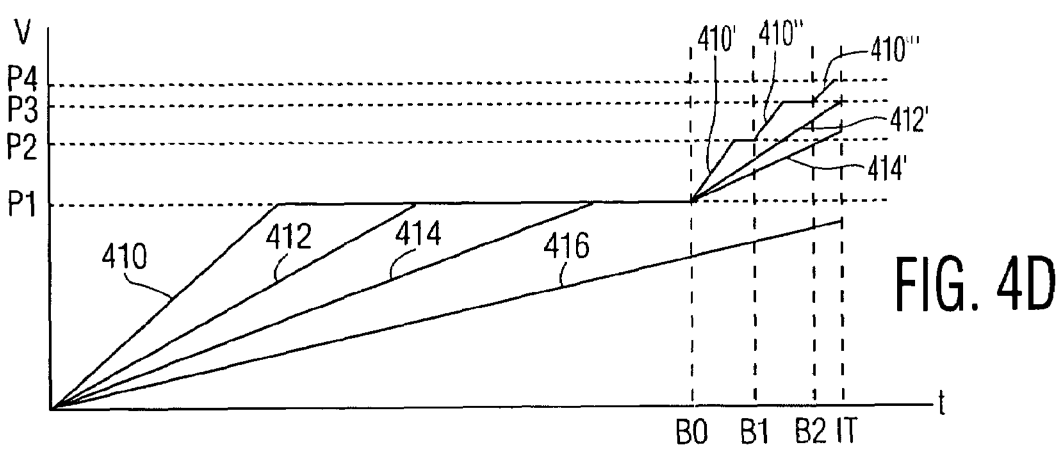
Figure 5:
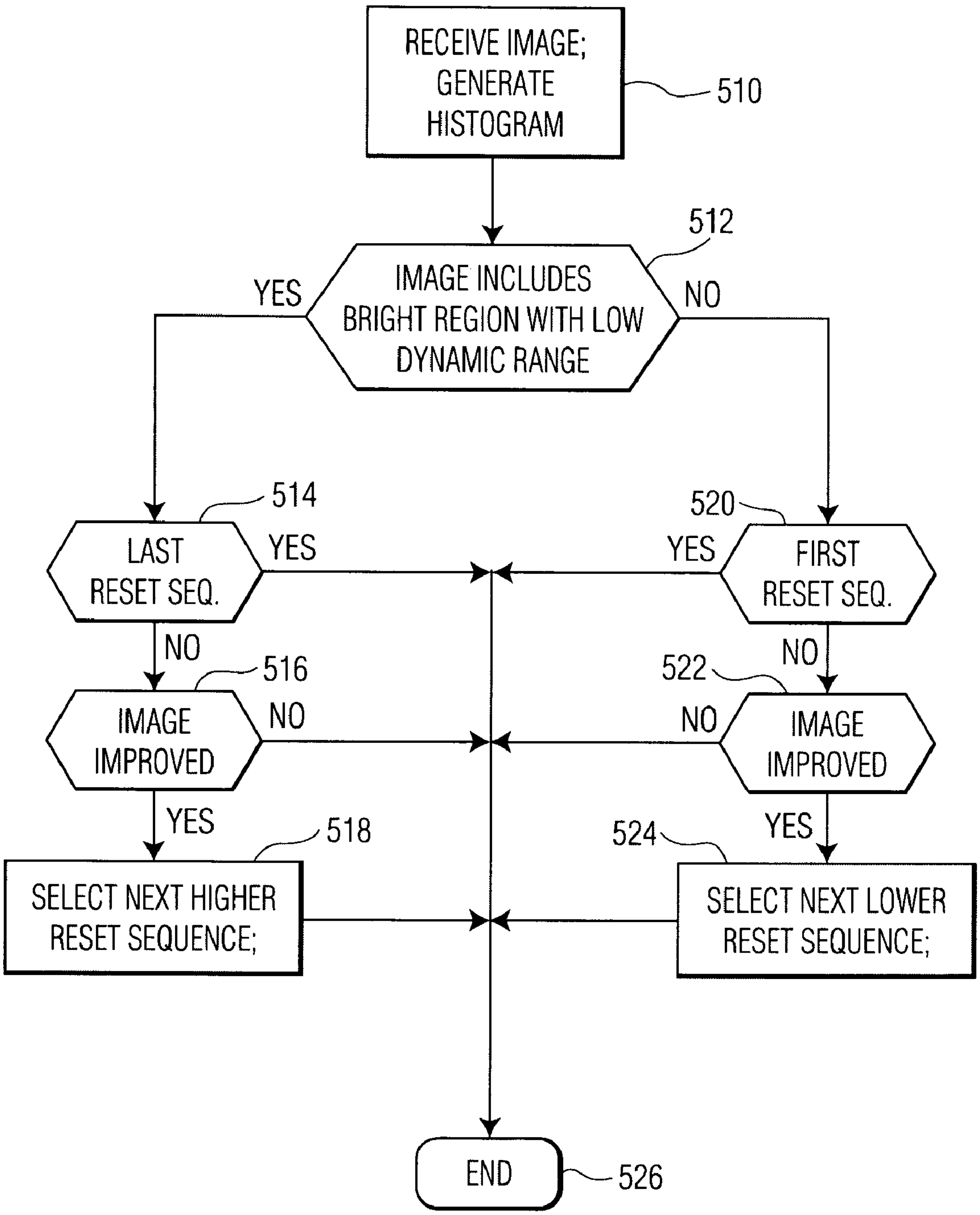
FIG. 5 is a flow-chart diagram which is useful for describing the operation of the present invention.

Adding another reset potential (P3), as shown in FIG. 4C allows more illumination levels to be distinguished but does not increase the difference between the relative values of illumination. Adding yet another reset level (P4), as shown in FIG. 4D both increases the levels of illumination that may be detected and spreads these illumination levels out over the range of output values. Note that 410", 412', 414' and 416 are easily distinguished in their output values.

The subject invention combines a manipulation of the reset levels with the histogramming circuitry to obtain images having increased contrast from the imager 110. In the exemplary embodiment of the invention, the individual reset levels and timing are fixed and the ASIC signals the pixel reset circuitry to apply a particular reset level using a two-bit value. The timing of the application of the reset level may be predetermined or may be adjusted as a part of the process described below with reference to FIG. 5. In the exemplary embodiment of the invention, the system applies a sequence of reset potentials to the imager in order to obtain an image having good dynamic range. This sequence may be a single potential, as shown in FIG. 4A or a sequential combination of potentials, as shown in FIGS. 4B–4D. This reset potential setting is continually updated as each new image is received. As with the histogramming information, the reset potential settings generated from each image are applied to the next image. The decision on how to modify the sequence of reset potentials based on the histogramming function, is shown in the flow-chart diagram of FIG. 5.

In the first step of this flow-chart, step 510, the ASIC 120 receives an image from the imager array 110 and generates a histogram. At step 512, the process determines if the image includes a bright region with low dynamic range. This determination may be made, for example, if the histogram for the image has a significant number of pixels (e.g. more than 100) that are at or near (e.g. within 10% of) the maximum brightness level for the imager.

If such a region does not exist, then the imager may benefit from using a reset sequence that has a lower dynamic range and, thus, greater quantization resolution for each image level. In this instance, step 520 determines if the reset sequence currently in use is the first sequence, that is to say, the sequence corresponding to the lowest dynamic range. If it is, then no further improvement is possible and control transfers to step 526, the end of the process. If the current sequence is not the first sequence then step 522 is executed which determines whether the sequence was previously changed and if so, whether there was an improvement in the image. Improvement in the image may be measured, for example, by comparing the highest level in the histogram for the current image to the corresponding level from the immediately previous image. If the current image has brighter objects then changing the reset sequence improved the image. If, at step 522, there was a previous sequence change but no improvement in the image then control transfers to step 526. Otherwise, step 524 is executed which changes the reset sequence to the one corresponding to the next lower dynamic range and then transfers control to step 526.

If, at step 512, a relatively large bright region does exist, then the imager may benefit from using a reset sequence that has a higher dynamic range. In this instance, step 514 determines if the reset sequence currently in use is the last sequence, that is to say, the sequence corresponding to the highest dynamic range. If it is, then no further improvement is possible and control transfers to step 526. If the current sequence is not the last sequence then step 516 is executed which determines whether the sequence was previously changed and if so, whether there was an improvement in the image. Improvement in the image may be measured, for example, by comparing the number of pixels at the brightest level in the histogram for the current image to the corresponding number of pixels from the immediately previous image. If the current image has fewer pixels at this level than the previous image then changing the reset sequence improved the image. If, at step 516, there was a previous sequence change but no improvement in the image then control transfers to step 526. Otherwise, step 518 is executed which changes the reset sequence to the one corresponding to the next higher dynamic range and then transfers control to step 526.

At the same time that the ASIC 120 is adjusting the reset sequence, it is also performing the histogramming operations. Thus, both the overall contrast of the image and the quantization resolution are iteratively increased until a best possible value is reached. Because the camera is continually monitoring image quality and adjusting the XDR parameters and the histogram LUT, the camera continually adjusts to ambient lighting conditions.

While the system is described in terms of an adaptive method for adjusting the dynamic range of the video signal, it is contemplated that it may be practiced as a programmable system. In a surveillance application, for example, respectively different reset sequences and LUT's can be determined based on camera position in a fixed scan path, time of day and even day of year. These parameters may be programmed into the ASIC 120 or may be externally provided to the ASIC 120, for example by a single-bit $I^2C$ bus. Thus, the system may be programmed according to predetermined criteria to produce optimum images.

Although the invention has been described in terms of one or more exemplary embodiments, it is contemplated that it may be practiced as outlined above within the scope of the attached claims.

What is claimed:

1. A single chip, CMOS imaging device comprising:

an array of pixels for providing a signal representing a scene;

pixel reset circuitry for resetting said pixels in said array of pixels according to a reset sequence, wherein said reset sequence controls both timing and reset potential;

a row of extended dynamic range sample and hold circuits for receiving a signal from said array of pixels;

a row of linear sample and hold circuits for receiving another signal from said array of pixels;

memory control and histogram circuitry which is configured to be used to generate a histogram of said signal from said array of pixels and to determine if said histogram of said signal is within predetermined limits, wherein said reset sequence is configured to be adjusted if said histogram of said signal is not within said predetermined limits;

an image processor for determining a controllable function and for processing a plurality of signals received from said extended dynamic range sample and hold circuits and said linear sample and hold circuits according to said controllable function to form a processed video signal; and a memory for storing said controllable function and said processed video signal.

2. The device of claim 1, wherein said memory is dual-ported.

3. The device of claim 1, wherein said image processor transmits timing and control signals to said array of pixels.

4. The device of claim 1, further comprising a regulated power supply.

5. The device of claim 4, further comprising a watchdog circuit for receiving a timing signal from said regulated power supply.

6. The device of claim 5, wherein an output from said watchdog circuit comprises a trigger pulse for said image processor.

7. The device of claim 1, further comprising a digital to analog converter coupled to said image processor to convert said processed video signal into a predetermined format.

8. The device of claim 7, wherein an output from said digital to analog converter is an interlaced video signal.

9. The device of claim 7, wherein said digital to analog converter outputs an RS-170 compliant video signal.

10. The device of claim 1, wherein said array of pixels contains an array of photodetectors.

11. The device of claim 1, wherein said array of pixels is an active pixel sensor device.

12. The device of claim 1, wherein said image processor is programmable based on at least one of i) a position of the imaging device, ii) a scan path of the imaging device, iii) a time of day and iv) a day of year.

13. A method of processing a signal from an imaging device comprising the steps of:

a) receiving an image representing a scene from an image array;

b) generating a histogram of the image;

c) determining if the image includes a portion having a predetermined brightness and a predetermined dynamic range based on the histogram;

d) determining if a current reset sequence is an initial reset sequence based on the result of step c);

e) determining if the current reset sequence was changed based on the determination of step d) and whether the image received in step a) is an improved image over an immediately previous image; and f) changing the reset sequence based on the result of step e).

14. A method according to claim 13 further comprising the steps of:

g) determining if the current reset sequence has changed from a last reset sequence based on the result of step c);

h) determining if the current reset sequence was previously changed based on the result of step g);

i) determining whether there is an improvement in the image based on the result of step h); and j) changing a reset level based on the result of step i).

15. A method according to claim 13, further comprising the step of simultaneously performing histogramming operations during the reset sequence adjustments.

16. A method according to claim 13, wherein said determination of step b) is based on a histogram of the image having at least 100 pixels that are within about 10 percent of a maximum brightness level for the image array.

17. A method according to claim 13, wherein said determination of step e) is based on comparing a highest level of the histogram generated in step b) with a highest level of a histogram for the immediately previous image.

* * * * *

UNITED STATES PATENT AND TRADEMARK OFFICE

CERTIFICATE OF CORRECTION

PATENT NO. : 6,992,713 B2
DATED : January 31, 2006
INVENTOR(S) : Nathaniel Joseph McCaffrey et al.

It is certified that error appears in the above-identified patent and that said Letters Patent is hereby corrected as shown below:

Title page,
Item [54], Title, should read -- FULLY INTEGRATED SOLID STATE IMAGER AND CAMERA CIRCUITRY --.

Signed and Sealed this

Twenty-third Day of May, 2006

JON W. DUDAS
*Director of the United States Patent and Trademark Office*